UNITED STATES PATENT OFFICE.

JOHN H. KELLOGG, OF BATTLE CREEK, MICHIGAN.

CEREAL COFFEE OR COFFEE SUBSTITUTE.

1,069,267.     Specification of Letters Patent.     Patented Aug. 5, 1913.

No Drawing. Original application filed May 20, 1912, Serial No. 698,585. Divided and this application filed July 29, 1912. Serial No. 712,010.

*To all whom it may concern:*

Be it known that I, JOHN H. KELLOGG, a citizen of the United States, a resident of the city of Battle Creek, in the county of Calhoun and State of Michigan, have invented certain new and useful Improvements in Cereal Coffees or Coffee Substitutes, of which the following is a specification.

This invention relates to improvements in a cereal coffee or coffee substitutes, and is a division of my prior application, Serial No. 698,585, filed May 20th, 1912.

One of the principal objects of the invention is to provide a cereal coffee which may be easily prepared, and which will possess a pleasing taste imitating that of coffee.

A further object of my invention is to provide a beverage of the character described which may be prepared for immediate use by merely adding hot water.

Other objects and many of the advantages of the invention will be apparent from the following description which discloses a preferred form of cereal coffee made in pursuance of the invention and a preferred process for producing the same.

In carrying out my invention I combine malted cereals such as malted wheat, bran, barley, rye and barley sprouts, with bran, unmalted wheat, rye and barley, and roast the whole together, it being specifically understood, however, that any one of the above or other desirable malted cereals may be employed, and that a single one or any preferred combination of the unmalted cereals mentioned above may be used.

The proportions employed preferably are substantially as follows:—To a mixture containing about equal parts of bran, rye, wheat, and barley I add from five to ten per cent. of malt, and preferably a percentage of barley sprouts. The purpose of the malt is to aid in completely liquefying the starch contained in the unmalted cereals, and also to aid in producing the desired flavor. The barley sprouts are added mainly because of their effect upon the flavor. The unmalted cereals are mixed and cooked, and the malted cereals added to about one-third of the cooked mixture with water and digested until the starch is liquefied, whereupon the balance of the ingredients are added. The mixture is then dried and thoroughly roasted or torrified, after which it is boiled to extract the soluble matter, the boiling being carried on for from one-half to one hour according to conditions. It is desirable to boil the mixture for a considerable period or until substantially all the soluble matter has been extracted. The liquor is then drawn off from the insoluble matter and concentrated or evaporated to a syrup-like consistency. The residue or insoluble matter from which the liquid has been drawn is dried and about one-half more or less mixed with the concentrated syrup or extract and dried. The drying of the extract mixed with the residue causes a coating of the soluble matter contained in the extract upon the fine particles of this matter. The residue or insoluble matter from which the coffee liquor has been drawn being a waste product can thus very conveniently and inexpensively be used as a vehicle or means for carrying the syrup or extract which is applied to the residue in the form of a coating. While it is preferable to employ the residue for this purpose it will be understood that it serves merely as a vehicle or carrier, and that it may be replaced by other suitable material without departing from the spirit and scope of the invention or sacrificing any of its advantages. After the coated residue has been dried it is ground to break up the matter which may have adhered together into granular form.

Where it is desired to prepare a coffee substitute which will, when hot water is added thereto, provide a sweetened product, my invention contemplates the addition of sugar to the extract or syrup before the same is mixed with the residue preliminary to the formation of the coating thereon, as has been previously described.

The cereal coffee prepared by adding hot water to the coated grains made in pursuance of my invention provides a materially superior product than where a cereal coffee is merely boiled before it is used, as the concentration of the liquor derived from the boiling operation serves to drive off the numerous volatile acids which are produced in the roasting of the cereal so that the final product is free from the same.

It will be apparent that numerous modifications of the method hereinbefore disclosed and of the article produced thereby may be resorted to without departing from the spirit or scope of my invention, or sacrificing any of its advantages.

I claim:—

1. The process of preparing cereal coffee consisting of combining malt with cereals, then digesting, and adding bran, unmalted wheat, rye and barley and roasting the mixture, boiling this mixture to extract the soluble matter, extracting the liquor and concentrating it to a syrup-like consistency, mixing the concentrated extract with about one-half the insoluble residue dried whereby the surfaces of insoluble particles are coated with the concentrated extract, drying this mixture, and grinding coarsely.

2. The process of preparing cereal coffee consisting of adding ten per cent. malt to an unmalted cereal and roasting the mixture, boiling this mixture to extract the soluble matter, extracting the liquor and concentrating it to a syrup-like consistency, mixing the concentrated extract with about one-half the insoluble residue dried whereby the surfaces of the insoluble particles are coated with the concentrated extract, and drying this mixture.

3. The process of preparing cereal coffee consisting of adding malt to a mixture of cereals and roasting the mixture, adding water and boiling to extract the soluble matter, extracting the liquor thus obtained and concentrating it to a syrup-like consistency, drying a portion of the residue obtained in the extraction of the liquor, and coating the same with the extract.

4. The process of preparing cereal coffee consisting of adding malt to a mixture of cereals and roasting the mixture, adding water and boiling to extract the soluble matter, extracting the liquor thus obtained and concentrating it to a syrup-like consistency, drying a portion of the residue obtained in the extraction of the liquor, coating the same with the extract and drying.

5. The process of preparing cereal coffee consisting of forming a mixture of cereals, malt and barley sprouts, adding water and boiling, extracting the liquor thus obtained and concentrating it to a syrup-like consistency, drying the insoluble residue and coating the particles thereof with the extract, drying this mixture and grinding coarsely.

6. The process of preparing cereal coffee consisting of combining substantially ten per cent. of malt with a mixture of cereals, adding water and boiling, extracting the liquor thus obtained and concentrating it to a syrup-like consistency, drying the insoluble residue and coating the particles thereof with the extract, drying this mixture and grinding coarsely.

7. The process of manufacturing cereal coffee consisting of combining malt with a mixture of cereals, adding water and boiling the same, extracting the liquor thus obtained, and adding material adapted to form a carrier for the said extract.

8. The process of manufacturing cereal coffee consisting in combining malt with a mixture of cereals, adding water and boiling the same, extracting the liquor thus obtained and concentrating the same, and adding material adapted to form a carrier for the said concentrated extract.

9. The process of manufacturing cereal coffee consisting in combining malt with a mixture of cereals, adding water and boiling the same, extracting the liquor thus obtained and concentrating the same, adding material adapted to form a carrier for the said concentrated extract, and drying.

10. The process of manufacturing cereal coffee consisting in combining malt with a mixture of cereals, adding water and boiling the same, extracting the liquor thus obtained and concentrating it to a syrup-like consistency, adding material adapted to form a carrier for the said extract, and drying the same.

11. The process of manufacturing cereal coffee consisting in combining malt with a mixture of cereals, adding water and boiling the same, extracting the liquor thus obtained and concentrating it to a syrup-like consistency, adding material adapted to form a carrier for the said extract, drying the same, and grinding coarsely.

12. The process of preparing cereal coffee consisting of combining malt with a mixture of cereals, adding water and boiling the same, extracting the liquor thus obtained and concentrating it to a syrup-like consistency, adding an insoluble matter in granular form to the extract, drying the same and grinding coarsely.

13. The process of preparing cereal coffee consisting of forming a mixture of cereals and malt, boiling the same to liquefy the starch, drawing off the liquid containing the starch, roasting the residue, adding water and boiling, extracting the liquor thus obtained and concentrating it to a syrup-like consistency, drying the residue from which the liquor has been extracted and coating the particles thereof with the extract.

14. A coffee substitute comprising a material having a coating of the soluble matter extracted from a roasted mixture of malt, and a cereal.

15. A coffee substitute comprising a roasted mixture of malt and a cereal from which the soluble matter has been extracted, and a coating of said soluble matter upon the said mixture.

16. A cereal coffee substitute comprising a mixture of cereals with 10% malt, said mixture having a soluble matter extracted therefrom and deposited upon the surfaces thereof in the form of a coating.

17. A coffee substitute comprising a mixture of malt, barley sprouts and cereals roasted and having a soluble matter extracted therefrom and deposited upon the surfaces thereof in the form of a coating.

18. A coffee substitute comprising a roasted mixture of malt, wheat, bran, rye and barley, said mixture having a soluble matter extracted therefrom and deposited upon the surfaces thereof in the form of a coating.

19. A coffee substitute comprising a roasted mixture in granular form of malt and a cereal from which the soluble matter has been extracted, and a coating of said soluble matter upon the surfaces of the granules.

20. A coffee substitute comprising a roasted mixture of cereals with ten per cent. malt, said mixture having the soluble matter extracted therefrom and being in granular form, said granules having a coating of the said soluble matter.

21. A coffee substitute comprising a mixture of malt, barley sprouts and cereals roasted and having the soluble matter extracted therefrom, said mixture being in granular form, the said granules being coated with the said soluble matter.

22. A coffee substitute comprising a roasted mixture of malt, wheat, bran, rye and barley, said mixture having the soluble matter extracted therefrom and being in granular form, the granules of the said mixture being coated with the soluble coating extracted from the mixture.

JOHN H. KELLOGG.

Witnesses:
JESSE ARTHUR,
BESSIE E. FAGAN.